(12) United States Patent
Ozcan

(10) Patent No.: US 9,886,166 B2
(45) Date of Patent: Feb. 6, 2018

(54) METHOD AND APPARATUS FOR GENERATING AUDIO INFORMATION

(71) Applicant: Nokia Technologies Oy, Espoo (FI)

(72) Inventor: Koray Ozcan, Farnborough (GB)

(73) Assignee: Nokia Technologies Oy, Espoo (FI)

( * ) Notice: Subject to any disclaimer, the term of this patent is extended or adjusted under 35 U.S.C. 154(b) by 203 days.

(21) Appl. No.: 13/730,954

(22) Filed: Dec. 29, 2012

(65) Prior Publication Data

US 2014/0189510 A1 Jul. 3, 2014

(51) Int. Cl.
*G06F 3/048* (2013.01)
*G06F 3/0482* (2013.01)
*G06F 17/30* (2006.01)
*H04M 3/56* (2006.01)

(52) U.S. Cl.
CPC ...... *G06F 3/0482* (2013.01); *G06F 17/30743* (2013.01); *G06F 17/30749* (2013.01); *G06F 17/30769* (2013.01); *H04M 3/568* (2013.01)

(58) Field of Classification Search
None
See application file for complete search history.

(56) References Cited

U.S. PATENT DOCUMENTS

| | | | |
|---|---|---|---|
| 3,990,105 A | 11/1976 | Fast et al. | |
| 5,918,223 A * | 6/1999 | Blum | G06F 17/30017 |
| 7,383,509 B2 * | 6/2008 | Foote | G09B 5/00 704/E15.045 |
| 7,571,014 B1 * | 8/2009 | Lambourne | H04R 27/00 700/94 |
| 7,756,874 B2 | 7/2010 | Hoekman et al. | |
| 8,483,544 B2 * | 7/2013 | Hamada | G11B 27/034 386/241 |
| 2003/0037036 A1 * | 2/2003 | Weare | G06F 17/30598 |
| 2004/0037540 A1 * | 2/2004 | Frohlich | G11B 31/006 386/285 |

(Continued)

FOREIGN PATENT DOCUMENTS

| | | |
|---|---|---|
| EP | 1884951 A1 | 2/2008 |
| EP | 2 284 730 A1 | 2/2011 |

(Continued)

OTHER PUBLICATIONS

International Search Report and Written Opinion for Application No. PCT/IB2013/061318 dated Mar. 7, 2014.

(Continued)

*Primary Examiner* — Hua Lu
(74) *Attorney, Agent, or Firm* — Alston & Bird LLP

(57) ABSTRACT

A method, apparatus and computer program product are provided to facilitate the review of audio files, such as in conjunction with the selection of one or more audio files. In the context of a method, one or more audio characteristics are determined for each of one or more audio files. The method may also include causing a visual representation of the one or more audio files to be presented for selection. The method may also include providing for at least one visual element representative of at least one of the one or more audio characteristics of the respective audio files to be displayed based on the determined one or more audio characteristics with the presentation of the visual representation of the one or more audio files.

26 Claims, 5 Drawing Sheets

(56) References Cited

U.S. PATENT DOCUMENTS

| | | | |
|---|---|---|---|
| 2005/0097075 A1* | 5/2005 | Hoekman | G06F 17/30038 |
| 2008/0167995 A1* | 7/2008 | Cue | G06F 21/10 |
| | | | 705/59 |
| 2008/0168390 A1* | 7/2008 | Benyamin | G06F 17/30743 |
| | | | 715/810 |
| 2009/0063414 A1* | 3/2009 | White | G06F 17/30017 |
| 2009/0150445 A1* | 6/2009 | Herberger | G06F 17/30743 |
| 2010/0070917 A1* | 3/2010 | Gates | G06F 17/30053 |
| | | | 715/810 |
| 2010/0192066 A1* | 7/2010 | Wu | G06F 17/30749 |
| | | | 715/727 |
| 2011/0081006 A1* | 4/2011 | Hao | H04M 3/53333 |
| | | | 379/88.13 |
| 2011/0087965 A1* | 4/2011 | Johansson | G06F 17/30017 |
| | | | 715/727 |
| 2011/0173539 A1* | 7/2011 | Rottler | G06F 3/0482 |
| | | | 715/727 |
| 2012/0023403 A1* | 1/2012 | Herberger | G06F 17/30743 |
| | | | 715/716 |
| 2012/0089910 A1* | 4/2012 | Cassidy | H04L 47/36 |
| | | | 715/716 |
| 2013/0054251 A1* | 2/2013 | Eppolito | H03G 7/007 |
| | | | 704/500 |
| 2013/0304777 A1* | 11/2013 | Bilinski et al. | 707/828 |
| 2014/0068520 A1* | 3/2014 | Missig | G06F 3/0482 |
| | | | 715/841 |

FOREIGN PATENT DOCUMENTS

| | | |
|---|---|---|
| EP | 2 320 335 A2 | 5/2011 |
| JP | 2000/259137 A | 9/2000 |
| JP | 2009/031549 A | 2/2009 |
| WO | WO-2012/021627 A1 | 2/2012 |

OTHER PUBLICATIONS

Genesis Loudness Online [online] [retrievied Nov. 23, 2015]. Retrieved from the Internet: <URL: http://genesis-acoustics.com/en/loudness_online-32.html>. 2 pages.

* cited by examiner

METHOD AND APPARATUS FOR GENERATING AUDIO INFORMATION

TECHNOLOGICAL FIELD

An example embodiment of the present invention relates generally to an audio file and, more particularly, to the generation of audio information.

BACKGROUND

Many computing devices, such as mobile terminals, e.g., cellular telephones, smart phones, tablet computers or the like, store or otherwise have the access to a plurality of audio files. The audio files may include ringtones, alerts, music files or recorded audio signals. A user of a computing device may desire to select one or more of the audio files to be played, such as in response to a predefined trigger condition. For example, the user may select one or more ringtones to be played in response to an incoming call. Additionally or alternatively, the user may select one or more alerts to be played in response to the satisfaction of a predefined triggering condition, such as the receipt of an electronic mail message, the receipt of a text message or the like.

In order to identify the audio files, objective information relating to the audio files may be presented upon the display of the computing device. The objective information may include the file name, the file number and/or the file format. In some instances, the objective information that is presented with respect to the audio files from which a user is selecting may be insufficient for the user to make an informed decision as to the most appropriate audio file to be selected. For example, a user may wish to make a selection based upon the audio characteristics of the audio files, such as the perceived loudness, the signal rhythm, the dynamic range or the signal bandwidth of a ringtone or alert. In order to make a selection based upon the audio characteristics, however, a user may have to select and play the audio files. In an instance in which a user is selecting an audio file from amongst the plurality of audio files, the selection and playing of each of the plurality of audio files may be time consuming. Additionally, a user may be located or otherwise situated such that the user is unable to play one or more of the audio files. For example, a user may be in a meeting, a theatre or other location in which the playing of an audio file would be disruptive or otherwise undesired.

BRIEF SUMMARY

A method, apparatus and computer program product are provided in accordance with an example embodiment of the present invention in order to facilitate the review or consideration of one or more audio files, such as in conjunction with the selection of the one or more audio files. In one embodiment, a method, apparatus and computer program product may cause at least one visual element representative of at least one audio characteristic of one or more audio files to be presented. As such, a user may select an audio file based upon the visual element(s) representative of the audio characteristic(s) of the one or more audio files in a manner that is efficient and effective and does not require the one or more audio files to be played. As such, the method, apparatus and computer program product of an example embodiment may permit the informed selection of an audio file, even in an instance in which the playing of an audio file to discern its audio characteristics would be undesired.

In one embodiment, a method is provided that includes determining, with a processor, one or more audio characteristics of each of one or more audio files. Various audio characteristics may be determined including, for example, at least one of timbre, loudness, duration, location, pitch, tempo, melody, harmony, texture, bandwidth, frequency content, channel numbers, spatial audio effects, roughness, sharpness, reverberation time, early decay time, coloration or dynamic range. In one embodiment, the method may determine the one or more audio characteristics by determining one or more audio characteristics of one or more audio files based upon a comparison of at least one of one or more frequencies or amplitudes of the respective audio file, one or more predetermined reference values or a reference audio file. The one or more audio characteristics that are determined may include perceivable information. The method may also include causing a visual representation of the one or more audio files to be presented for selection. The method of this embodiment also includes providing for at least one visual element representative of at least one of the one or more audio characteristics of the respective one or more audio files to be displayed based on the determined one or more audio characteristics with the presentation of the visual representation of the one or more audio files. The visual element of one embodiment may include a plurality of visual elements representative of an audio characteristic of a respective audio file.

The method of one embodiment may cause the visual representation of the one or more audio files to be presented by causing the visual representation of the one or more audio files to be presented in a list associated with an application. In this embodiment, the method may provide at least one visual element representative of at least one of the one or more audio characteristics of the respective one or more audio files to be displayed by providing the at least one visual element representative of at least one of the one or more audio characteristics of the respective one or more audio files to be displayed in association with the list of the visual representation of the one or more audio files. In this embodiment, the method may cause the visual representation of the one or more audio files to be presented in a list by ordering the list of the one or more audio files based upon at least one of the determined one or more audio characteristics, a type of application or input provided by the user. The method of one embodiment may also include identifying an audio file following presentation of the visual representation of the one or more audio files and the at least one of the one or more audio characteristics of the one or more audio files.

In another embodiment, an apparatus is provided that includes at least one processor and at least one memory including computer program code with the at least one memory and the computer program code configured to, with the processor, cause the apparatus to at least determine one or more audio characteristics of each of one or more audio files, such as at least one of timbre, loudness, duration, location, pitch, tempo, melody, harmony, texture, bandwidth, frequency content, channel numbers, spatial audio effects, roughness, sharpness, reverberation time, early decay time, coloration or dynamic range of each of one or more audio files. The one or more audio characteristics that are determined may include perceivable information. In one embodiment, the at least one memory and the computer program code are configured to, with the processor, cause the apparatus to determine one or more audio characteristics by determining one or more audio characteristics of one or more audio files based upon a comparison of at least one of one or more frequencies or amplitudes of the respective audio file, one or more predetermined reference values or a reference audio file. The at least one memory and the computer program code may also be configured to, with the processor, cause the apparatus to cause a visual representation of the one or more audio files to be presented for selection. In addition, the at least one memory and the computer program code may be configured to, with the processor, cause the apparatus to provide for at least one visual element representative of at least one of the one or more audio characteristics of the respective one or more audio files to be displayed based on the determined one or more audio characteristics with the presentation of the visual representation of the one or more audio files. The visual element of one embodiment may include a plurality of visual elements representative of an audio characteristic of a respective audio file.

The at least one memory and the computer program code may be configured to, with the processor, cause the apparatus of an example embodiment to cause the visual representation of the one or more audio files to be presented by causing the visual representation of the one or more audio files to be presented in a list associated with an application. In this embodiment, the at least one memory and the computer program code may be configured to, with the processor, cause the apparatus to provide at least one visual element representative of at least one of the one or more audio characteristics of the respective one or more audio files to be displayed by providing the at least one visual element representative of at least one of the one or more audio characteristics of the respective one or more audio files to be displayed in association with the list of the visual representation of the one or more audio files. In this embodiment, the at least one memory and the computer program code may be configured to, with the processor, cause the apparatus to cause the visual representation of the one or more audio files to be presented in a list by ordering the list of the one or more audio files based upon at least one of the determined one or more audio characteristics, a type of application or input provided by the user. The at least one memory and the computer program code may be further configured to, with the processor, cause the apparatus of an example embodiment to identify an audio file following presentation of the visual representation of the one or more audio files and the at least one of the one or more audio characteristics of the one or more audio files.

In a further embodiment, a computer program product includes at least one non-transitory computer-readable storage medium having computer-executable program code portions stored therein with the computer-executable program code portions including program code instructions for determining one or more audio characteristics of each of one or more audio files. The one or more audio characteristics that are determined may include perceivable information. In one embodiment, the program code instructions for determining one or more audio characteristics include program code instructions for determining at least one of timbre, loudness, duration, location, pitch, tempo, melody, harmony, texture, bandwidth, frequency content, channel numbers, spatial audio effects, roughness, sharpness, reverberation time, early decay time, coloration or dynamic range of each of a plurality of audio files. The computer-executable program code portions may also include program code instructions for causing a visual representation of the one or more audio files to be presented for selection. Additionally, the computer-executable program code portions may include program code instructions for providing for at least one visual element representative of at least one of the one or more audio characteristics of the respective one or more audio files to be displayed based on the determined one or more audio characteristics with the presentation of the visual representation of the one or more audio files. The visual element of one embodiment may include a plurality of visual elements representative of an audio characteristic of a respective audio file.

The program code instructions for causing the visual representation of the one or more audio files to be presented may include program code instructions for causing the visual representation of the one or more audio files to be presented in a list associated with an application. In this embodiment, the program code instructions for providing at least one visual element representative of at least one of the one or more audio characteristics of the respective one or more audio files to be displayed may include program code instructions for providing the at least one visual element representative of at least one of the one or more audio characteristics of the respective one or more audio files to be displayed in association with the list of the visual representation of the one or more audio files. In this embodiment, the program code instructions for causing the visual representation of the one or more audio files to be presented in a list may include program code instructions for ordering the list of the one or more audio files based upon at least one of the determined one or more audio characteristics, a type of application or input provided by the user. The computer-executable program code portions of an example embodiment may also include program code instructions for identifying an audio file following presentation of the visual representation of the one or more audio files and the at least one of the one or more audio characteristics of the one or more audio files.

In yet another embodiment, an apparatus is provided that includes means for determining one or more audio characteristics of one or more audio files. The one or more audio characteristics that are determined may include perceivable information. The apparatus of this embodiment also includes means for causing a visual representation of the one or more audio files to be presented for selection. The apparatus may also include means for providing for at least one visual element representative of at least one of the one or more audio characteristics of the respective one or more audio files to be displayed based on the determined one or more audio characteristics with the presentation of the visual representation of the one or more audio files.

BRIEF DESCRIPTION OF THE DRAWINGS

Figure 1:
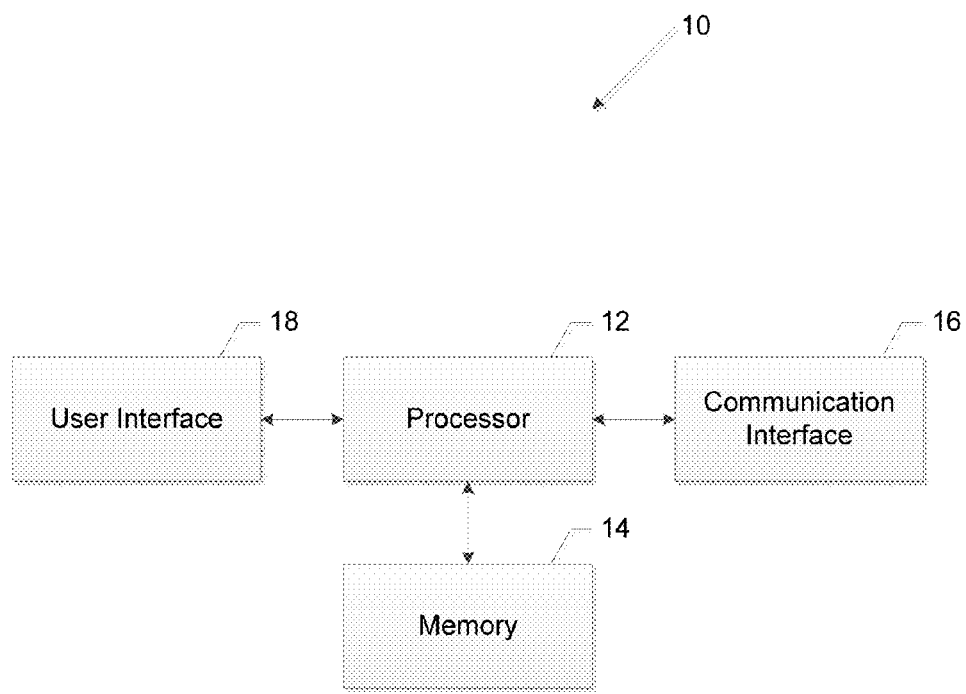
Figure 2:
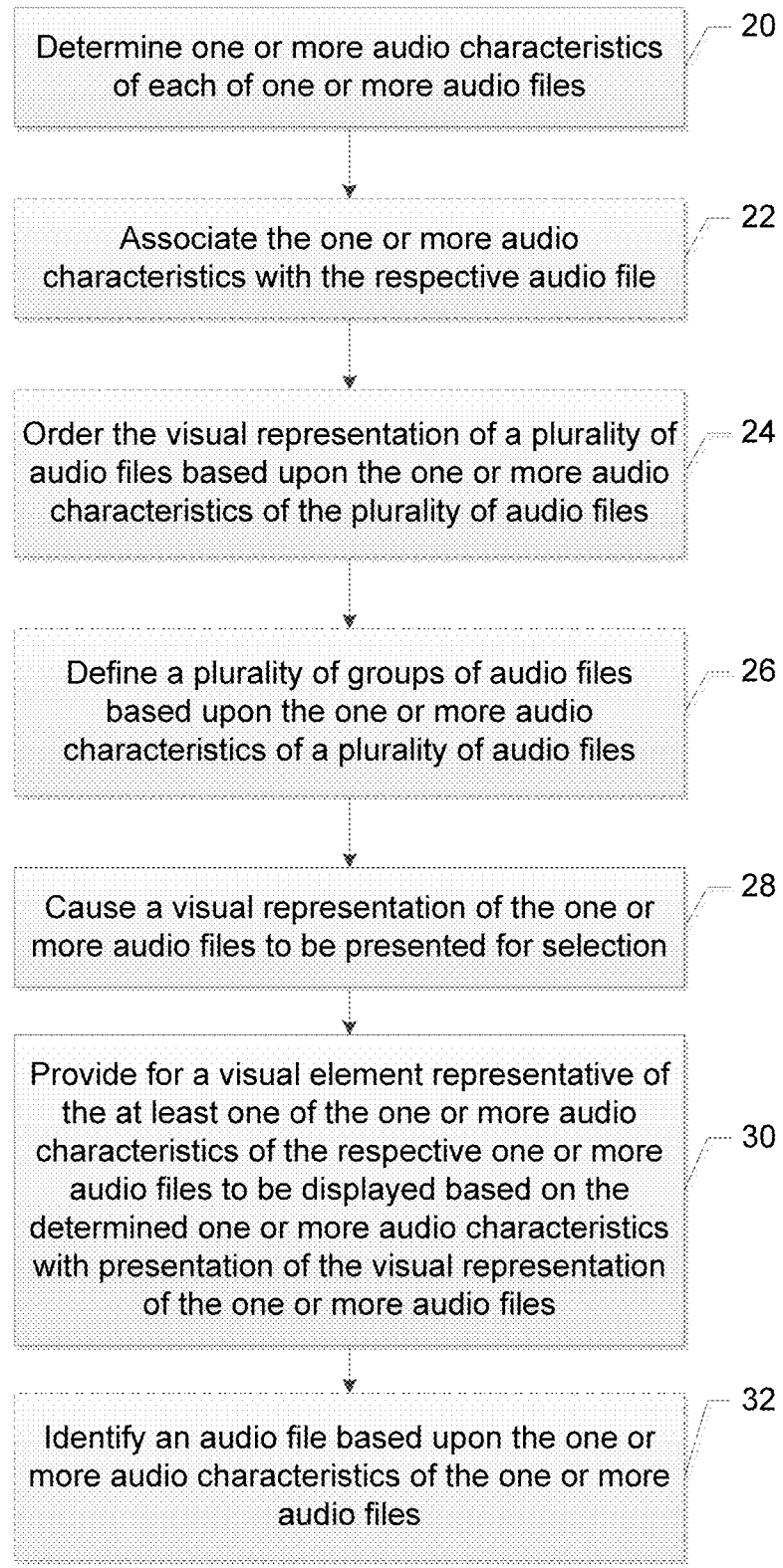
Figure 3:
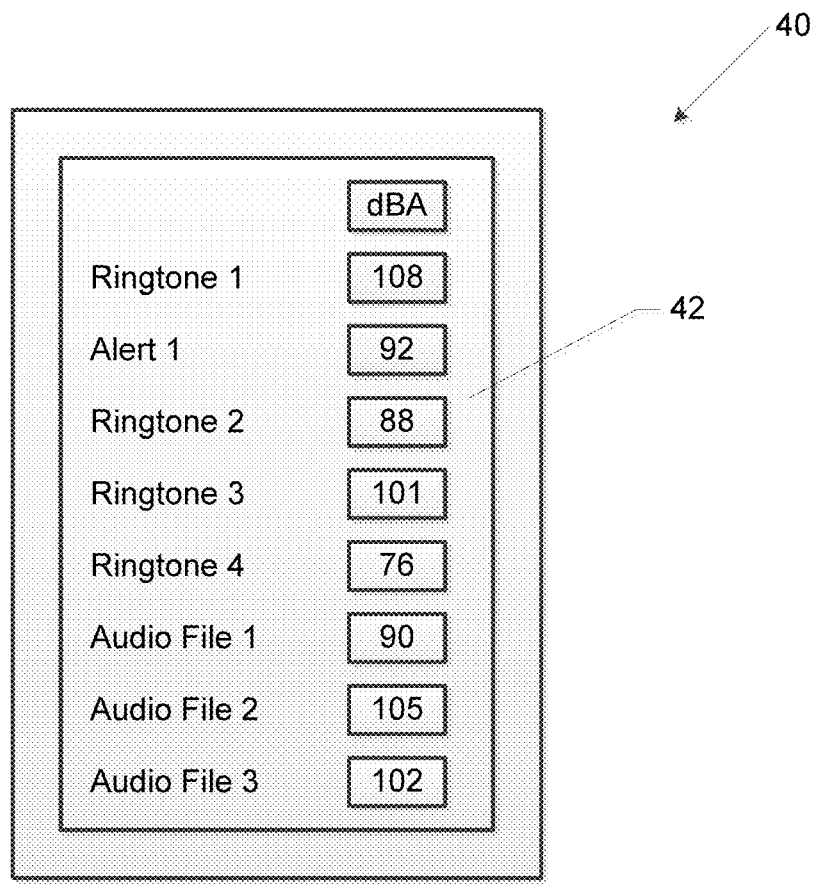
Figure 4:
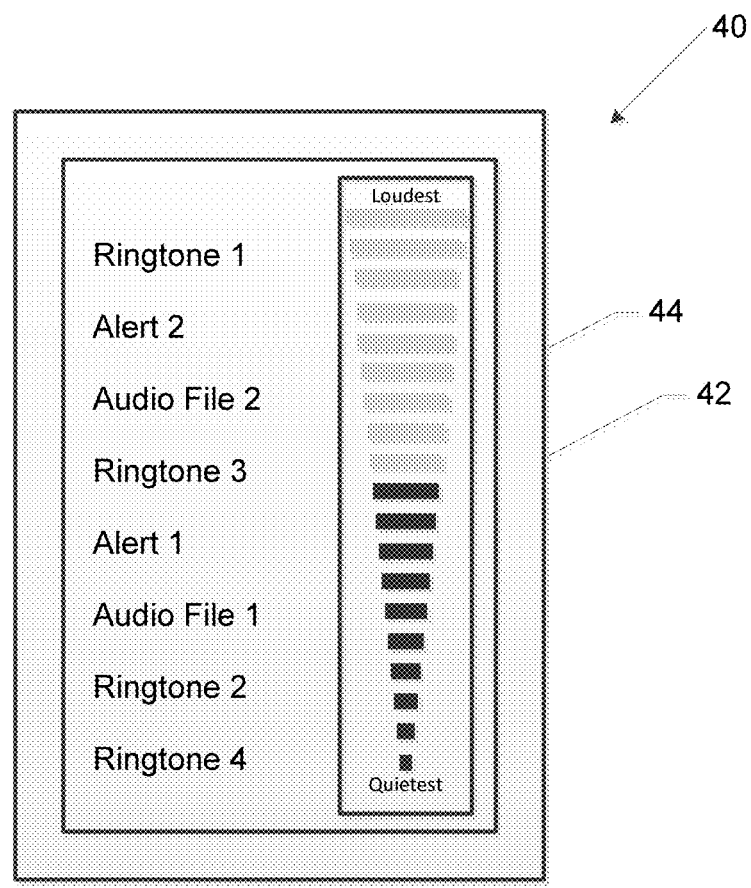
Figure 5:
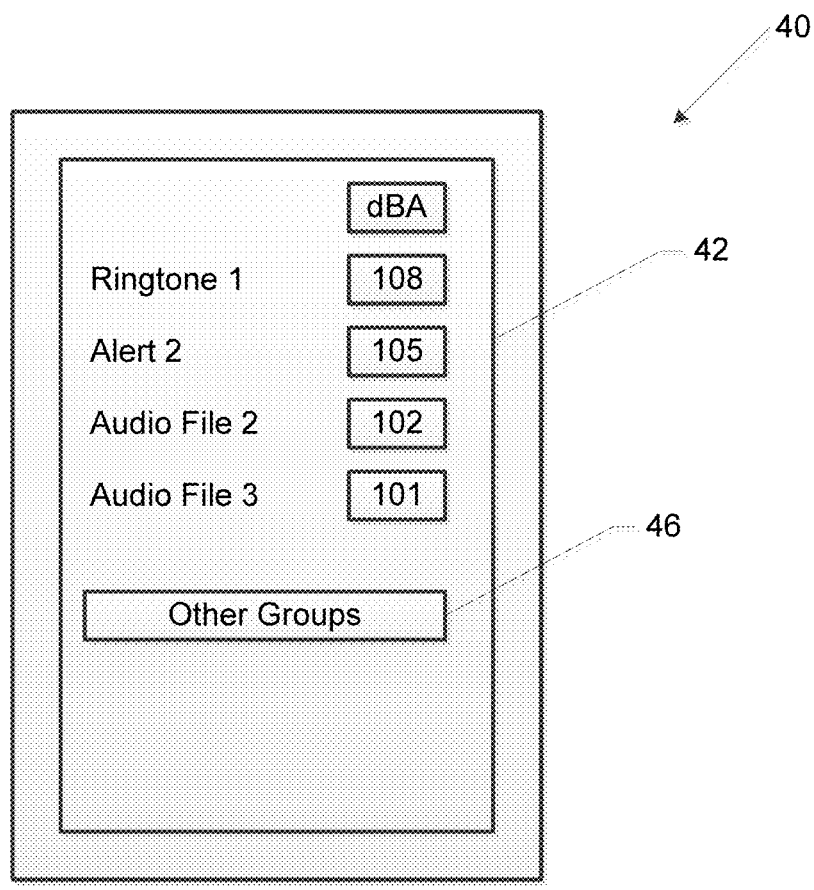

Having thus described certain example embodiments of the present invention in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating operations that may be performed, such as by the apparatus of FIG. 1, in accordance with an example embodiment of the present invention;

FIG. 3 is an example of a display providing a visual representation of an audio characteristic of each of a plurality of audio files in accordance with an example embodiment of the present invention;

FIG. 4 is a display of a visual representation of an audio characteristic of each of a plurality of audio files that are ordered based upon the audio characteristic of the plurality of audio files in accordance with an example embodiment of the present invention; and FIG. 5 is a display of the visual representation of an audio characteristic of each audio file of a group of audio files in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to cause a visual element representative of at least one audio characteristic of one or more audio files to be presented. Based upon the visual element(s) representative of the audio characteristic(s) of the audio file(s), a user may select one or more audio files, such as for use as a ring tone, an alert or otherwise, without having to play the audio files. As such, the method, apparatus and computer program product of an example embodiment permit a user to select an audio file in an informed and efficient manner and without requiring the audio file(s) to be played which may, in some instances, be impractical or undesirable.

The method, apparatus and computer program product of an example embodiment may cause the visual element(s) representative of one or more audio characteristics of one or more audio files to be presented upon a display of a computing device. In this regard, the computing device may be a mobile terminal, such as a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Alternatively, the computing device may be a fixed computing device, such as a personal computer, a computer workstation or the like. Regardless, the computing device may include or otherwise be associated with the display upon which the visual representation(s) of the one or more audio characteristics of the one or more audio files may be presented in accordance with an example embodiment of the present invention.

An example embodiment of the invention will now be described with reference to FIG. 1, in which certain elements of an apparatus 10 for causing a visual element representative of at least one audio characteristic of one or more audio files to be presented are depicted. The apparatus of FIG. 1 may be employed, for example, in conjunction with, such as by being incorporated into or embodied by, the computing device that includes or is otherwise associated with the display upon which the visual element(s) representative of the audio characteristic(s) of the one or more audio files are presented. For example, the apparatus may be embodied by a mobile terminal or a fixed computing device that includes or is otherwise associated with the display. Alternatively, the apparatus may be separate from the computing device or at least from the display that is associated with the computing device, but the apparatus of this embodiment may be in communication with the computing device, such as via wireline or wireless communications, in order to direct the presentation of the visual representation(s) of the audio characteristic(s) of the one or more audio files upon the display.

It should also be noted that while FIG. 1 illustrates one example of a configuration of an apparatus 10 for causing a visual element representative of at least one audio characteristic of one or more audio files to be presented, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 10 for causing a visual element representative of at least one audio characteristic of one or more audio files to be presented may include or otherwise be in communication with a processor 12, a memory device 14, a communication interface 16 and optionally a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device, such as a mobile terminal or a fixed computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 16 may be any means such as a device or circuitry embodied in either hardware or a combination of hardware and software that is configured to receive and/or transmit data from/to a network and/or any other device or module in communication with the apparatus 10, such as the computing device that includes or is otherwise associated with the display upon which visual representation(s) of the audio characteristic(s) of the one or more audio files are presented or the display itself in instances in which the apparatus is separate from the computing device and/or the display. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms In some embodiments, the apparatus 10 may include a user interface 18 that may, in turn, be in communication with the processor 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a speaker, or other input/output mechanisms. In one embodiment, the user interface includes the display upon which visual representation(s) of the audio characteristic(s) of the one or more audio files are presented. Alternatively or additionally, the processor may comprise user interface circuitry configured to control at least some functions of one or more user interface elements such as a display and, in some embodiments, a speaker, ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

Referring now to FIG. 2, the operations performed, such as the apparatus 10 of FIG. 1, in accordance with an example embodiment are illustrated. As shown in block 20 of FIG. 2, the apparatus may include means, such as the processor 12 or the like, for determining one or more audio characteristics of each of one or more audio files. The one or more audio characteristics that are determined may include perceivable information. The audio files may include any of a variety of different types of audio files including, for example, ring tones, alerts, music files, recorded audio signals or the like. The audio files may be comprised of one or more audio signals. Thus, reference herein to audio characteristics of an audio file includes audio characteristics of the audio signals(s) that comprise the audio file. In one embodiment, the audio files may be stored in memory 14. The audio files may be provided by the manufacturer or other supplier of a computing device that embodies the apparatus, such as the manufacturer of a mobile terminal that embodies the apparatus, or by the owner of the audio files. Additionally or alternatively, the audio files may be downloaded and stored, such as by the user, once the user has possession of the computing device that embodies the apparatus. For example, a computing device that embodies the apparatus may be initially provided with one or more audio files by the manufacturer or other supplier and the user may thereafter optionally download and store one or more additional audio files in memory.

The audio characteristic(s) that are determined for each of the one or more audio files may be predefined or may be selected by the user, such as based upon the one or more audio characteristics that are of most interest to the user. The audio characteristics that are determined may include perceivable information. By way of example, but not of limitation, the audio characteristic(s) that are determined by the apparatus 10, such as the processor 12, may be an objective representation, e.g., an objective value, of the resulting hearing perception of any of the basic qualities of sound including timbre, loudness, duration, location and pitch. For example, the audio characteristic(s) may include the choice of sound source, e.g., the source of timbres, such as voice, musical instrument, natural sound, etc., the number of sound sources (as may be determined by the audio signals recorded by a plurality of microphones), the directionality of the sound sources (as may be determined by the recording microphone), the number of sounds such as a single sound or multiple sounds, volume level such as quiet or loud, location such as front or rear, pitch such as high or low, duration such as short or long, or the like. Other examples of audio characteristics include an audio reproduction channel number, e.g., mono, stereo, binaural, multi-channel surround sound, etc., a signal-to-noise ratio, a crest factor, signal power (short term and/or long term), a maximum intensity, distortion, frequency content, a signal frequency bandwidth, roughness, sharpness, reverberation time, early decay time, coloration or a dynamic range, such as the ratio of the softest sound to the loudest sound in a signal with the ratio usually being measured by a physical unit, namely, decibels, that indicates the maximum output signal relative to the noise floor. Some audio files may include multi-channel audio signals arising from a multi-channel recording, e.g., a surround sound recording. In these embodiments, the audio file may include spatial audio effects, e.g., stereo widening, reverberation, echo, direction, ambience, etc. Thus, the audio characteristics of some multi-channel audio signals include the spatial audio effects. Additionally or alternatively, for audio files that have more complex sound combinations, the audio characteristics may include tempo (e.g., organized durations), melody (e.g., organized pitch sequences), harmony (e.g., summed pitches) and texture (e.g., organized timbres or sound sources).

As the foregoing examples demonstrate, the audio characteristics may include perceivable information that may be based upon user perception and recognition of the audio characteristics. In this regard, the perceivable information provides information that would otherwise be determined psychoacoustically, that is, by the psychoacoustic phenomenon of the hearing system. As an example, in an instance in which an audio signal is played, the audio signal is reproduced by a transducer which converts the audio signal into acoustic energy, which is evaluated by a user's hearing mechanism to finalize a decision regarding the manner in which the audio signal is acoustically perceived, thereby allowing the brain to decide, for example, whether the acoustic energy is loud or quiet. Other information that is determined psychoacoustically in this example may include positional information, e.g., sound source direction, as well as its respective ambience. However, this example required that the audio signal be played, which may be undesirable in some instances. Thus, the method, apparatus and computer program product of an example embodiment may simulate the listening experience of a user by providing for the determination of the audio characteristics including the perceivable information of an audio file that would otherwise have been determined psychoacoustially, but without requiring the audio file to be played. In other words, the audio characteristics including the perceivable information that are determined may provide the information that otherwise would be determined in the acoustic domain in which the perceivable information of the audio characteristics would be evaluated by the hearing mechanism. Alternatively, the audio characteristics including the perceivable information that are determined may provide the information that otherwise would be determined based upon vibrations, such as by utilization of a suitable bone conduction technology. As such, the perceivable information (or perceptual information) is understood be "audible" when the audio signal is reproduced or played. It is also understood that the method, apparatus and computer program product of an example embodiment present one or more audio characteristics for visual review that would otherwise be evaluated by the hearing mechanism when the audio files were reproduced.

The audio characteristics may additionally or alternatively be based upon a comparison of two or more sounds. Thus, the apparatus 10 of one embodiment may include means, such as a processor 12 or the like, for determining one or more audio characteristics of each audio file based upon a comparison of two or more sounds of a respective audio file. By way of example, two or more sounds of an audio file, such as two or more signal frequencies and/or amplitudes of an audio file, may be compared to identify audio characteristics by determining, for example, whether two or more sounds belong together, whether two or more sounds are the same or different, whether one sound is longer or shorter than another sound, whether one sound is higher or lower than another sound, whether the sounds are going up or down, whether the volume is increasing or decreasing, whether two sounds represent a gradual change or a sudden change, or the like. In this regard, the amplitude of one or more frequencies of an audio file may be determined and compared, either as a short term analysis over a frequency range or a long term analysis over the full bandwidth of the audio file. Alternatively, two or more audio files may be compared, such as by using filter bank analysis that analyzes the content of each filter, to determine the audio characteristics. In addition to or instead of determining an audio characteristic based upon a comparison of signal frequencies and/or amplitudes, the apparatus, such as the processor, may be configured to determine one or more audio characteristics of a respective audio file by comparing the audio file to one or more predetermined reference values and/or by comparing the audio file to a reference audio file.

The apparatus 10, such as the processor 12, may determine the audio characteristic(s) of the one or more audio files in various manners, either automatically, semi-automatically or manually, such as in response to a request by a user. For example, the audio file may include or otherwise be associated with metadata that defines one or more audio characteristics of the respective audio file. As such, the apparatus, such as the processor, may determine one or more audio characteristics of each of one or more audio files by reference to the audio characteristics defined by metadata associated with the respective audio files. In this embodiment, the audio characteristic(s) of the one or more audio files may have been determined in the first instance remote from the apparatus and the computing device that may embody the apparatus, such as by the source of the audio file, with the audio characteristics being provided with the audio file in the form of metadata or otherwise. Alternatively, the apparatus, such as the processor, may analyze the one or more audio files in order to determine the audio characteristic from the examination of the audio file(s) themselves. Still further, the apparatus, such as the processor, may determine the audio characteristic(s) of one or more audio files based upon audio characteristic(s) that are provided by the manufacturer, owner of the audio file or the user. As such, reference herein to determining audio characteristics of one or more audio files may alternatively be described as identifying the audio characteristics of one or more audio files, analyzing the audio characteristics of one or more audio files and/or providing the audio characteristics of one or more audio files. Thus, the discussion provided herein with respect to determining the audio characteristics of one or more audio files applies equally with respect to identifying, analyzing and/or providing the audio characteristics of one or more audio files.

The audio characteristic(s) that are determined may be requested by the user. Alternatively, the audio characteristic(s) that are determined may be dependent upon the type of application with which the audio file(s) are designed to be executed and/or the location in which the audio file(s) are stored. For example, an audio file may be stored in a music library such that that the processor 12 may be configured to determine the audio characteristic(s) that are associated with music. Alternatively, the audio file may be stored in a ringtone library such that the processor may be configured to determine the audio characteristic(s) that are associated with ringtones, e.g., those audio characteristics that cause a user to effectively and sufficiently informed of a predefined event.

As shown in block 28 of FIG. 2, the apparatus 10 may include means, such as the processor 12, the user interface 18 or the like, for causing a visual representation of the one or more audio files to be presented for selection based on the visual representation. It is noted that an audio file need not always be selected in that the user can visualize the audio characteristic(s) associated with the one or more audio files without making a selection. The one or more audio files may be visually represented in various manners including by an alphanumeric designation, e.g., written text, name, objective representation, etc., by a color code, by highlighting, as an icon, a graphical image, or otherwise. Although the type of visual representation of the one or more audio files may be predefined in one embodiment, the type of visual representation of the one or more audio files may be selected by a user, such as from a plurality of options, in another embodiment. In one embodiment, the visual representation of the one or more audio files may be presented in a list, such as a list that is associated with an application. In this regard, the list may include the visual representations of the audio files that are associated with a respective application, such as a respective application being executed by the apparatus.

As shown in block 30 of FIG. 2, the apparatus 10 may also include means, such as the processor 12, the user interface 18 or the like, for providing for at least one visual element, such as a plurality of visual elements, representative of at least one audio characteristic of one or more respective audio files to be displayed based on the determined one or more audio characteristics. The display of the at least one visual element representative of at least one audio characteristic may be concurrent with the presentation of the visual representation of the one or more audio files. The audio characteristic for which a visual element is provided may be predefined, at least for a respective application being executed by the apparatus, or may vary, such as by being subject to selection by a user.

The audio characteristics may be visually represented in various manners including numerically, via an alphanumeric designation or another objective measure, or non-numerically, such as with bars or other non-numeric, e.g., relative, indications. Although the type of visual element representative of the audio characteristic(s) may be predefined in one embodiment, the type of visual element representative of the audio characteristic(s) may be selected by a user, such as from a plurality of options, in another embodiment. Alternatively, the type of visual element representative of the audio characteristic(s) may be adaptive and may be, for example, based upon the application executed by the apparatus 10. The visual element representative of at least one audio characteristic of the respective audio file may be presented in association with the visual representation of the respective audio file such that each of the one or more audio files have a corresponding visual representation and an associated visual element representative of at least one audio characteristic of the respective audio file. In this regard, the visual element representative of at least one audio characteristic of the respective audio file may be associated with the visual representation of the respective audio file by causing the visual elements representative of the audio characteristic and the visual representation of the respective audio file to be positioned in a predefined relationship to one another, such as by being positioned alongside one another. Although different audio characteristics may be visually represented for different ones of the audio files, the method, apparatus 10 and computer program product of an example embodiment may cause a visual element representative of the same one or more audio characteristics to be presented for a plurality of audio files, thereby permitting a user to make a comparison between the plurality of audio files based upon the same audio characteristic(s).

By way of example in which the audio characteristic for which a representative visual element is presented is the loudness of the respective audio files, FIG. 3 depicts a computing device 40, such as a mobile terminal, having a display 42 that may be caused to present visual elements representative of a plurality of audio files, such as by the alphanumeric designations for Ringtones 1-4, Alert 1 and Audio files 1-3. The loudness may be determined in various manners including the Stevens, Zwicker and Moore techniques. The loudness of each audio file, as measured in decibels (acoustic) (dBA) in this example embodiment, is visually represented by the numeric designation that is associated with the respective audio files, such as by being visually displayed immediately to the right of the visual representation of the respective audio file. As shown, the loudness of the audio files of this example range from 76 to 108 dBA. A user may therefore select an audio file based upon the loudness of the audio file, such as by selecting a loud ring tone or a soft ring tone, selecting a loud audio file or a soft audio file, or the like. Although shown in terms of dBA, other objective data associated with loudness may be utilized including a perceived unit of loudness (phon) or a sound pressure level (SPL), which is an objective unit of loudness. Although numerical representations of the audio characteristics of a plurality of audio files are described above, the audio characteristics of the audio files may be visually represented in other manners, such as by a color code or in another non-numeric manner. For example, the visual representations of the audio files of FIG. 3 that have associated audio characteristics that exceed a predefined threshold, such as by having a loudness greater than 100 dBA, may be bolded or presented in a particular color, e.g., red, to accentuate their relative loudness. The audio characteristics may be presented, such as in a non-numeric manner, that provides a measure of relativity. Thus, the audio characteristics may provide a relative, as opposed to an absolute, measure with the relative measure being provided relative to one another and/or relative to another standard or unit of measure.

By way of example, a method, apparatus and computer program product are therefore provided according to one embodiment for determining perception information for one or more audio characteristics of each of one or more audio files. The method, apparatus and computer program product of this embodiment may also cause a visual representation of the one or more audio files to be presented for selection. The method, apparatus and computer program product of this embodiment may further provide for at least one visual element representative of said perception information for said at least one of the one or more audio characteristics of the respective one or more audio files to be displayed, either numerically or non-numerically, based on the determined perception information for said one or more audio characteristics with the presentation of the visual representation of the one or more audio files. The perception information may include objective information providing an evaluation of the audio characteristics of an audio file. The evaluations for each of a plurality of the audio files may be comparatively displayed together.

In some embodiments, perception information comprises at least one objective value for at least one audio characteristic of an audio file. The perception information may help a user to understand the audio characteristic(s) without listening to the audio file. In one embodiment, the audio signal of the audio file is a ring tone, notification alert or alarm and the at least one audio characteristic represents loudness information. In one embodiment, the at least one objective value of loudness is visually represented as a value in phon (perceived unit of loudness), a value in SPL (objective unit of loudness), a color code, etc.

By way of example, a method, apparatus and computer program product are therefore provided according to one embodiment for determining one or more audio characteristics of each of one or more ring tones and/or alerts. The method, apparatus and computer program product of this embodiment may also cause a visual representation of the one or more ring tones and/or alerts to be presented for selection. The method, apparatus and computer program product of this embodiment may further provide for at least one visual element representative of said at least one of the one or more audio characteristics of the respective one or more ring tones and/or alerts to be displayed, either numerically or non-numerically, based on the determined one or more audio characteristics with the presentation of the visual representation of the one or more ring tones and/or alerts.

The apparatus 10, such as the processor 12, the user interface 18 or the like, may be configured to provide for at least one visual element representative of at least one audio characteristic of one or more audio files to be displayed based on user input. For example, the user input may be a voice message, such as may be detected and then recognized. Alternatively, the user input may be a key press or touch detection. By way of example, the user input that directs that at least one visual element representative of at least one audio characteristic be displayed could be a long key press or a long touch. In this regard, a short press could be configured to open and play the audio file in a conventional manner, while a long press could cause a visual element representative of at least one audio characteristic to be displayed. The audio characteristics for which respective visual elements are displayed may be all potential audio characteristics or one or more desired audio characteristics that have been requested by the user or that are relevant to the application that is to execute the respective audio file. In one embodiment, the apparatus, such as the processor, may be configured to permit a user to select whether the audio characteristics are to be determined automatically or manually, e.g., in response to a user request, and/or to select whether visual elements representative of the audio characteristics are to be displayed automatically or manually.

As represented by the dashed lines in FIG. 2, the operations that are performed, such as by the apparatus 10 of FIG. 1, may include one or more optional operations. As illustrated in block 22 of FIG. 2, the apparatus of one example embodiment may include means, such as the processor 12 or the like, for associating the one or more audio characteristics with the audio file. For example, the apparatus, such as the processor, may store the audio characteristic(s) that are determined as metadata that is included within or otherwise associated with the respective audio file.

As shown in block 24 of FIG. 2, in an instance in which visual representations of a plurality of audio files are presented for selection, the apparatus 10 of an example embodiment may also include means, such as the processor 12, the user interface 18 or the like, for ordering the visual representation of the plurality of audio files, such as based upon at least one of one or more audio characteristics of the plurality of audio files, a type of selected application and/or an input provided by the user. In this regard, the visual representations of the audio files may be presented in a list, such as a list associated with an application, e.g., the audio files for which visual representations are included in the list may be audio files configured to be executed or otherwise utilized by a respective application. As shown in FIG. 4, for example, the apparatus, such as the processor, the user interface or the like, of one embodiment, may order the visual representations of the audio files in a list having an ascending or descending order based upon an audio characteristic that may be expressed numerically, such as the loudness of the audio file as expressed in dBA. In FIG. 4, for example, the visual representations of the audio files are presented in an order from the audio file that is the loudest, e.g., Ringtone 1, to the audio file that is the quietest, e.g., Ringtone 4. In one embodiment, the visual representation of the plurality of audio files may be ordered or ranked relative to a predefined parameter or relative to a parameter identified by the user.

With reference, for example, to FIG. 4, a method, apparatus and computer program product are provided according to one embodiment for determining one or more audio characteristics of each of one or more audio files. The one or more audio characteristics may include perceivable information. The method, apparatus and computer program product of this embodiment may also cause a visual representation of the one or more audio files to be presented for selection. The method, apparatus and computer program product of this embodiment may further provide for at least one visual element representative of said at least one of the one or more audio characteristics of the respective one or more audio files to be displayed based on the determined one or more audio characteristics with the presentation of the visual representation of the one or more audio files. In this embodiment, the visual elements representative of the at least one of the one or more audio characteristics of the respective one or more audio files may be displayed in a relative manner, such as a non-numeric relative manner as shown by the bars of different length in FIG. 4. In this regard, the relativity of an audio characteristic may be determined by a comparison of an audio characteristic between various ones of the audio files or relative to a predefined standard.

In one embodiment in which visual representations of a plurality of audio files are presented for selection, the apparatus 10 may additionally or alternatively include means, such as the processor 12 or the like, for defining a plurality of groups of audio files based upon one or more audio characteristics of the plurality of audio files. See block 26 of FIG. 2. The apparatus, such as the processor, may define the plurality of groups in various manners depending upon the type of audio characteristic that has been determined for the plurality of audio files. With respect to the example of FIG. 3, the apparatus, such as the processor, may define a loud group of audio files to be those audio files having a loudness of more than a 100 dBA and a quiet group of audio files to be those audio files having a loudness of less than 100 dBA. As such, the display 42 of FIG. 5 depicts the loud group of audio files in accordance with this example embodiment. In the illustrated embodiment, the user may actuate button 46 to cause the other group(s) to be displayed. Although one example of the manner in which the audio files may be grouped based upon one or more audio characteristic is provided above, the apparatus, such as the processor, may group the audio files in a variety of different manners based upon one or more audio characteristics.

As shown in block 32 of FIG. 2, the apparatus 10 may include means, such as the processor 12, the user interface 18 or the like, for identifying an audio file based upon one or more audio characteristics of the one or more audio files, such as in response to receipt of a selection of one or more audio files by a user. In this regard, a user may view the visual representation(s) of the one or more audio files and the visual elements(s) representative of the one or more audio characteristics of the one or more audio files and then make a determination as to which one or more of the audio files to be selected, such as a ring tone, an alert or otherwise, based upon the audio characteristics without having to play one or more of the audio files. Thus, the user may make a selection of an audio file, which may be accomplished both in an informed and efficient manner, while avoiding any requirement to play the audio file(s), which may be advantageous in situations in which playing of the audio file would be impractical or undesirable. Additionally, the selection of the audio file may take into account the environment in which the audio file may thereafter be played to permit an audio file to be selected that has audio characteristics that permit the audio file to be played without having to change the audio settings of the computing device, e.g., without having to adjust the speaker volume.

In one embodiment, the apparatus 10, such as the processor 12 in response to signals detected by one or more microphones, may be configured to measure the noise floor in the vicinity of the user at the time at which the selection of the audio file is received. The processor of this embodiment may determine the initial difference between the audio characteristic, such as the loudness, that is associated with the selected audio file and the noise floor. The apparatus, such as the processor, may thereafter repeatedly measure the noise floor and, in an instance in which the noise floor changes, such as by changing at least as much as a predefined threshold, the apparatus, such as the processor, the user interface 18 or the like, may select a different audio file or prompt the user to select a different audio file. In this regard, the different audio file may be determined by the apparatus, such as the processor, such that the difference between the audio characteristic, such as the loudness, that is associated with the different audio file and the noise floor is the same as or within a predefined range of the initial difference. Thus, the apparatus of this embodiment may continue to provide a consistent user experience in regards to the playing of an audio file even as the noise floor in the vicinity of the user changes over time. Instead of selecting a different audio file, the apparatus, such as the processor, of one embodiment may compensate for changes in the noise floor by adjusting the volume or other audio setting of the computing device that will play the selected audio file such that the initial difference is maintained even as the noise floor changes.

In another embodiment, the apparatus, such as the processor 12, may be configured to identify the audio characteristic, such as the loudness, associated with the selected audio file as an audio characteristic that is desired by the user. Thereafter, in an instance in which a different audio file is to be played, such as in response to a call being received from a different caller, the apparatus, such as the processor, of this embodiment may be configured to adjust the volume or other audio setting of the computing device that will play the different audio file in order to be the same or within a predefined range of the audio characteristic of the selected audio file. Thus, the apparatus of this embodiment may provide for a more consistent user experience even as different audio files are played with the consistency based upon the audio characteristics of the selected audio file.

The method, apparatus and computer program product of example embodiments of the present invention are applicable to any audio signal inside the apparatus 10, e.g., an audio signal may be previously recorded, downloaded, received by other means or provided by the manufacturer. In example embodiments, it is not required to initiate any dedicated application inside the apparatus. It is understood that example embodiments of the present invention can be adapted by the core software of the apparatus for a seamless process. The apparatus displays determined characteristics wherein said determined characteristics are perceivable (therefore replacing or minimizing the need of listening). In some example embodiments, the method, apparatus and computer program product provide post-signal analysis to determine (or identify) and display said audio characteristics. The method, apparatus and computer program product of example embodiments of the present invention can work for any application (inside the apparatus) containing an audio signal including music library, ringtone menu, recorded audio signals, downloaded audio signals, etc. In further example embodiments, the method, apparatus and computer program product of an example embodiment of the present invention are adaptive based on the application type of the apparatus and/or user request, therefore only relevant characteristics are determined and/or displayed.

As described above, FIG. 2 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. The computer program product may be embodied as an application, e.g., an app, that is configured to implement, for example, at least certain ones of the operations of the flowchart of FIG. 2.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the blocks having a dashed outline in FIG. 2. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, with a processor, one or more audio characteristics of each of one or more audio files, wherein the one or more audio characteristics are a determined objective value of a resulting hearing perception of basic qualities of sound, wherein determining the one or more audio characteristics comprises analyzing the one or more audio files themselves without requiring an audible playing of the one or more audio files, wherein the one or more audio characteristics that are determined are dependent upon a type of executable application with which the one or more audio files are designed to be executed such that different types of audio characteristics are determined for different types of executable applications;
   associating the one or more audio characteristics with the respective one or more audio files by causing the one or more audio characteristics to be stored as data within or associated with the one or more audio files;
   causing a visual representation of the one or more audio files to be presented for selection; and
   providing for at least one visual element representative of at least one of the one or more audio characteristics of the respective one or more audio files to be displayed based on the determined one or more audio characteristics with presentation of the visual representation of the one or more audio files.

2. A method according to claim 1 wherein causing the visual representation of the one or more audio files to be presented comprises causing the visual representation of the one or more audio files to be presented in a list associated with an application, and wherein providing at least one visual element representative of at least one of the one or more audio characteristics of the respective one or more audio files to be displayed comprises providing the at least one visual element representative of at least one of the one or more audio characteristics of the respective one or more audio files to be displayed in association with the list of the visual representation of the one or more audio files.

3. A method according to claim 2 wherein causing the visual representation of the one or more audio files to be presented in a list comprises ordering the list of the one or more audio files based upon at least one of:
   the determined one or more audio characteristics;
   a type of application; or
   an input provided by the user.

4. A method according to claim 1 wherein the at least one visual element comprises a plurality of visual elements representative of an audio characteristic of a respective audio file.

5. A method according to claim 1 further comprising identifying an audio file following presentation of the visual representation of the one or more audio files and the at least one of the one or more audio characteristics of the one or more audio files.

6. A method according to claim 1 wherein determining one or more audio characteristics comprises determining at least one of timbre, loudness, duration, location, pitch, tempo, melody, harmony, texture, bandwidth, frequency content, channel numbers, spatial audio effects, roughness, sharpness, reverberation time, early decay time, coloration or dynamic range of each of the one or more audio files.

7. A method according to claim 1 wherein determining one or more audio characteristics comprises determining one or more audio characteristics of one or more audio files based upon a comparison of at least one of:
   one or more frequencies or amplitudes of the respective audio file;
   one or more predetermined reference values; or
   a reference audio file.

8. A method according to claim 1 further comprising:
   receiving a selection of an audio file; and
   causing a different audio file to be selected in response to a change in a noise floor.

9. A method according to claim 1 further comprising:
   receiving a selection of an audio file;
   identifying at least one audio characteristic associated with the audio file that was selected; and
   adjusting an audio setting in conjunction with playing of a different audio file based upon the at least one audio characteristic associated with the audio file that was selected.

10. An apparatus comprising at least one processor and at least one memory including computer program code, the at least one memory and the computer program code configured to, with the processor, cause the apparatus to at least:
   determine one or more audio characteristics of each of one or more audio files, wherein the one or more audio characteristics are a determined objective value of a resulting hearing perception of basic qualities of sound, wherein determining the one or more audio characteristics comprises analyzing the one or more audio files themselves without requiring an audible playing of the one or more audio files, wherein the one or more audio characteristics that are determined are dependent upon a type of executable application with which the one or more audio files are designed to be executed such that different types of audio characteristics are determined for different types of executable applications;
   associate the one or more audio characteristics with the respective one or more audio files by causing the one or more audio characteristics to be stored as data within or associated with the one or more audio files;
   cause a visual representation of the one or more audio files to be presented for selection; and
   provide for at least one visual element representative of at least one of the one or more audio characteristics of the respective one or more audio files to be displayed based on the determined one or more audio characteristics with presentation of the visual representation of the one or more audio files.

11. An apparatus according to claim 10 wherein the at least one memory and the computer program code are configured to, with the processor, cause the apparatus to cause the visual representation of the one or more audio files to be presented by causing the visual representation of the one or more audio files to be presented in a list associated with an application, and wherein the at least one memory and the computer program code are configured to, with the processor, cause the apparatus to provide at least one visual element representative of at least one of the one or more audio characteristics of the respective one or more audio files to be displayed by providing the at least one visual element representative of at least one of the one or more audio characteristics of the respective one or more audio files to be displayed in association with the list of the visual representation of the one or more audio files.

12. An apparatus according to claim 11 wherein the at least one memory and the computer program code are configured to, with the processor, cause the apparatus to cause the visual representation of the one or more audio files to be presented in a list by ordering the list of the one or more audio files based upon at least one of:
   the determined one or more audio characteristics;
   a type of application; or
   an input provided by the user.

13. An apparatus according to claim 10 wherein the at least one visual element comprises a plurality of visual elements representative of an audio characteristic of a respective audio file.

14. An apparatus according to claim 10 wherein the at least one memory and the computer program code are further configured to, with the processor, cause the apparatus to identify an audio file following presentation of the visual representation of the one or more audio files and the at least one of the one or more audio characteristics of the one or more audio files.

15. An apparatus according to claim 10 wherein determining one or more audio characteristics comprises determining at least one of timbre, loudness, duration, location, pitch, tempo, melody, harmony, texture, bandwidth, frequency content, channel numbers, spatial audio effects, roughness, sharpness, reverberation time, early decay time, coloration or dynamic range of each of the one or more audio files.

16. An apparatus according to claim 10 wherein the at least one memory and the computer program code are configured to, with the processor, cause the apparatus to determine one or more audio characteristics by determining one or more audio characteristics of one or more audio files based upon a comparison of at least one of:
   one or more frequencies or amplitudes of the respective audio file;
   one or more predetermined reference values; or
   a reference audio file.

17. An apparatus according to claim 10 wherein the at least one
   memory and the computer program code are further configured to, with the processor, cause the apparatus to:
   receive a selection of an audio file; and
   cause a different audio file to be selected in response to a change in a noise floor.

18. An apparatus according to claim 10 wherein the at least one memory and the computer program code are further configured to, with the processor, cause the apparatus to:
   receive a selection of an audio file;
   identify at least one audio characteristic associated with the audio file that was selected; and
   adjust an audio setting in conjunction with playing of a different audio file based upon the at least one audio characteristic associated with the audio file that was selected.

19. A computer program product comprising at least one non-transitory computer-readable storage medium having computer-executable program code portions stored therein, the computer-executable program code portions comprising program code instructions for:
   determining one or more audio characteristics of each of one or more audio files, wherein the one or more audio characteristics are a determined objective value of a resulting hearing perception of basic qualities of sound, wherein determining the one or more audio characteristics comprises analyzing the one or more audio files themselves without requiring an audible playing of the one or more audio files, wherein the one or more audio characteristics that are determined are dependent upon a type of executable application with which the one or more audio files are designed to be executed such that different types of audio characteristics are determined for different types of executable applications;

associating the one or more audio characteristics with the respective one or more audio files;

causing a visual representation of the one or more audio files to be presented for selection by causing the one or more audio characteristics to be stored as data within or associated with the one or more audio files; and providing for at least one visual element representative of at least one of the one or more audio characteristics of the respective one or more audio files to be displayed based on the determined one or more audio characteristics with presentation of the visual representation of the one or more audio files.

20. A computer program product according to claim 19 wherein the program code instructions for causing the visual representation of the one or more audio files to be presented comprise program code instructions for causing the visual representation of the one or more audio files to be presented in a list associated with an application, and wherein the program code instructions for providing at least one visual element representative of at least one of the one or more audio characteristics of the respective one or more audio files to be displayed comprise program code instructions for providing the at least one visual element representative of at least one of the one or more audio characteristics of the respective one or more audio files to be displayed in association with the list of the visual representation of the one or more audio files.

21. A computer program product according to claim 20 wherein the program code instructions for causing the visual representation of the one or more audio files to be presented in a list comprise program code instructions for ordering the list of the one or more audio files based upon at least one of:
the determined one or more audio characteristics;
a type of application; or
an input provided by the user.

22. A computer program product according to claim 19 wherein the at least one visual element comprises a plurality of visual elements representative of an audio characteristic of a respective audio file.

23. A computer program product according to claim 19 wherein the computer-executable program code portions further comprise program code instructions for identifying an audio file following presentation of the visual representation of the one or more audio files and the at least one of the one or more audio characteristics of the one or more audio files.

24. A computer program product according to claim 19 wherein determining one or more audio characteristics comprises determining at least one of timbre, loudness, duration, location, pitch, tempo, melody, harmony, texture, bandwidth, frequency content, channel numbers, spatial audio effects, roughness, sharpness, reverberation time, early decay time, coloration or dynamic range of each of the one or more audio files.

25. A computer program product according to claim 19 wherein the computer-executable program code portions comprise program code instructions for:
receiving a selection of an audio file; and
causing a different audio file to be selected in response to a change in a noise floor.

26. A computer program product according to claim 19 wherein the computer-executable program code portions further comprise program code instructions for:
receiving a selection of an audio file;
identifying at least one audio characteristic associated with the audio file that was selected; and
adjusting an audio setting in conjunction with playing of a different audio file based upon the at least one audio characteristic associated with the audio file that was selected.

* * * * *